3,305,413
SOLID PROPELLANT FORMULATION BASED ON HYDROXYLAMINE PERCHLORATES
James P. Flynn and Ernest J. Strayer, Midland, Mich., assignors to The Dow Chemical Company, Midland, Mich., a corporation of Delaware
No Drawing. Filed Dec. 10, 1962, Ser. No. 242,941
4 Claims. (Cl. 149—19)

This invention relates to rocket propellants and more particularly to a solid rocket propellant formulation based upon a hydroxylamine perchlorate having an epoxy resin binder.

It is a principal object of the present invention to provide a novel, solid rocket propellant based on a hydroxylamine perchlorate which composition has a significantly higher density than can be obtained with conventional solid propellants.

It is another object of the present invention to provide a hard, solid propellant of good physical strength which has a specific impulse greater than similar ammonium perchlorate based propellants.

These and other objects and advantages will become apparent from the detailed disclosure of the present invention presented hereinafter.

The novel propellant composition of the present invention comprises a hydroxylamine perchlorate complex salt held in a hard, resilient epoxy resin binder mixture of a high strength epoxy resin and flexible epoxy resin wherein the binder concentration ranges from about 10 to about 30 weight percent, and preferably about 20 weight percent of the total weight of the composition. Additionally other fuel constituents, particularly finely divided light metals such as aluminum, magnesium, beryllium and the like, for example, can be incorporated into the composition. When such additional fuel members are used, ordinarily the resulting binder-hydroxylamine perchlorate-metal concentrations in the propellant are varied to provide a propellant that is substantially stoichiometrically balanced with respect to fuel and oxidizer components. In any event, based on the total propellant composition the maximum metal concentration to be employed is about 30 weight percent. Preferably, powdered metal fuels are used over a range from about 10 to about 20 weight percent of the total composition.

Ordinarily hydroxylamine hydrogen perchlorate (i.e. the perchloric acid salt of hydroxylamine which ordinarily is referred to as hydroxylamine perchlorate

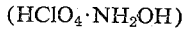
(HClO$_4$·NH$_2$OH)

bishydroxylaminelithium (I) perchlorate

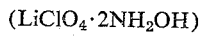
(LiClO$_4$·2NH$_2$OH)

or tetrakishydroxylaminemagnesium (II) perchlorate (Mg(ClO$_4$)$_2$·4NH$_2$OH) or mixtures of these are employed as the oxidizer, the perchloric acid salt itself being preferred.

The binder comprises a mixture of from about 80 to about 20 parts by weight of a high strength epoxy resin of polyglycidyl ethers of a polyhydric phenol and from about 20 to about 80 parts by weight of a flexible epoxy resin. Preferably about a 50–50 mixture of the two types of epoxy binders is employed.

The high strength epoxy resins ordinarily employed are the diglycidyl ethers of dihydric phenols having epoxide equivalent weights of from about 170 to about 200. Specifically, epoxy resins of diglycidyl ethers of bisphenol A having such epoxide equivalent weights are preferred. D.E.R. 331, D.E.R. 332, D.E.R. 334 (trademarks of The Dow Chemical Company for epoxy resins), Genepoxy 175, Genepoxy 190, Genepoxy M180 (trademarks of General Mills, Inc. for epoxy resins), Epon 815, Epon 828, Epon 826 (trademarks of Shell Chemical Company for epoxy resins) and the like resins are examples of particularly suitable high strength resins for use as binders in the present composition.

Flexible epoxy resins which are (1) aliphatic, (2) have a polyglycol, glycerol or glycol skeleton, or (3) have long aliphatic side chains of from about 8 to about 22 carbon atoms and preferably from about 16 to 18 carbon atoms (e.g. epoxidized oils) and which have a functionality of not more than about 2 have been found to be effective flexibilizers in the present binder composition. The term "functionality" as is understood in the resin art refers to the average number of reactive glycidyl groups per mole of material. Typical flexibilizers for use with the present binders include, for example, the trademarked resins D.E.R. 732, D.E.R. 736, Epon 812, Epon 871, Epon X-81, Epi-Rez 502, Epi-Rez 5021, Epi-Rez 5042 (Epi-Rez is a trademark of Jones-Dabney Division of Devoe & Raynolds) and the like.

The resiliency of the cured propellant depends upon the amount of flexibilizing agent present in the binder composition. The greater the percentage of this material used in the composition, the more resilient will be the final cured product. With amounts of flexibilizing agent greater than set forth herein, the resultant propellant grain may be soft and fluid even after extended periods of cure. Although a hard, high strength propellant is obtained if no flexibilizing agent, or, if less flexibilizing agent than that disclosed herein is incorporated into the binder, the resulting grain tends to be brittle. Such grains can undergo undesirable grain structure failure upon ignition shock and from pressures built up during combustion.

The size of the particulate metal fuel additive which can be added to the present composition is that traditionally employed in metallized solid propellants. Ordinarily the particles range from about 5 to about 25 microns and preferably substantially all pass a 325 mesh U.S. Standard sieve.

The instant propellant composition is prepared using mixing, formulating, casting and curing techniques as are well understood in the solid propellant fabrication art. Conveniently, the liquid binder, hydroxylamine perchlorate oxidizer material and other fuel component (if used) are mixed and stirred until a substantially homogeneous fluid mix is obtained. The resulting mass is cast and cured. Alternatively, the oxidizer and supplemental fuel member or members (if used) can be introduced separately or as a mixture into a continuously agitated mass of liquid binder and stirring be continued after completion of the addition until the desired degree of homogeneity is achieved in the mix.

The cast propellant grain is cured at relatively low temperatures, i.e. from about 25 to about 50° C., for an extended period of time. The length of time for cure varies inversely with cure temperature. For example, at room temperature, 20–25° C., the composition cures within from about 24 to about 72 hours.

With the present compositions there is the added advantage that no addition of amine compounds usually needed for curing such resins is necessary. The hydroxylamine based oxidizer material itself serves as a highly satisfactory curing agent. However, a polyamid, e.g. Versamid 140 (a trademarked product of General Mills, Inc.), can be added as curing agent if desired.

The following examples will serve to further illustrate the present invention, but are not meant to limit it thereto.

*Example 1*

About 20 parts by weight of a binder comprised of about 50 weight percent D.E.R. 332 resin (diglycidyl ethers of bisphenol A having an epoxide equivalent weight of from about 172–178) and about 50 weight percent Epon 812 resin (glycerine base) were admixed with about 80 parts by weight of hydroxylamine perchlorate $$(HClO_4 \cdot NH_2OH)$$

The mixing was carried out at room temperature, about 20° C., until a substantially homogeneous fluid mass was obtained. The resulting product mixture was cast and cured for about 2 days at room temperature. The cured grain was a hard solid with a density of about 2 grams/cubic centimeter and possessed a desirable amount of resiliency.

*Example 2*

About 10 parts by weight D.E.R. 334 resin (diglycidyl ethers of bisphenol A having an epoxide equivalent weight of about 178–186), about 10 parts by weight Epon 812 resin, about 60 parts by weight hydroxylamine perchlorate and about 20 parts by weight of aluminum powder of average particle size about 16 microns (95 percent of which metal powder passed through a 325 mesh U.S. Standard sieve) were mixed together at room temperature, about 20° C., in a dry atmosphere, cast into a propellant grain and allowed to cure at this temperature for about 48 hours. The resulting grain was hard, but had a desirable measure of flexibility.

The grain was fired in force-bomb tests and exhibited a specific impulse of about 250 seconds.

*Example 3*

A solid propellant was prepared from the ingredients described in Example 2 except that about 10 parts of tetrakishydroxylaminemagnesium (II) perchlorate was substituted for an equal weight of the hydroxylamine perchlorate.

The resulting grain was similar in hardness and flexibility to the grain described in Example 2 and had a lower impact sensitivity.

In a manner similar to that described for the foregoing examples a number of solid propellants were prepared by blending bishydroxylaminelithium (I) perchlorate with two component binders employing D.E.R. 331, D.E.R. 332 or D.E.R. 334 epoxy resins as the high strength component and a flexibilizing epoxy resin, as described herein. For the various blends the two binder components were varied to provide for a binder having from about 80 to about 20 parts of the D.E.R. resin and from about 20 to about 80 parts of the flexible epoxy resin. In all cases compatibility of the materials was found and all cured satisfactorily at room temperature. Similarly, blends of tetrakishydroxylaminemagnesium (II) perchlorate and hydroxylamine perchlorate also gave good solid propellant grains with these same resin binders upon admixing, casting and curing at room temperature.

Finely divided magnesium, beryllium, magnesium alloys and aluminum alloys can be employed as fuel additives in the present composition. Equivalent amounts of these can replace the aluminum described hereinbefore, or mixtures of these materials as well as mixtures of these metals with aluminum can be utilized in the present propellants.

Various modifications can be made in the present invention without departing from the spirit or scope thereof for it is understood that we limit ourselves only as defined in the appended claims.

We claim:

1. A solid rocket propellant composition which comprises;
(1) from about 70 to about 90 percent by weight of a member selected from the group consisting of hydroxylamine perchlorate $$(HClO_4 \cdot NH_2OH)$$

bishydroxylaminelithium (I) perchlorate $$(LiClO_4 \cdot 2NH_2OH)$$

tetrakishydroxylaminemagnesium (II) perchlorate $$(Mg(ClO_4)_2 \cdot 4NH_2OH)$$

and mixtures thereof, and
(2) from about 30 to about 10 percent by weight of an epoxy resin binder, said binder being a mixture of from about 80 to about 20 parts by weight of a high strength epoxy resin of polyglycidyl ethers of dihydric phenols having epoxide equivalent weights of from about 170 to about 200 and from about 20 to about 80 parts by weight of a flexible epoxy resin, said resin having a maximum functionality of about 2.

2. A solid rocket propellant composition which comprises;
(a) from about 10 to about 30 percent by weight of an epoxy resin binder, said binder being a mixture of from about 80 to about 20 parts by weight of a high strength epoxy resin of polyglycidyl ethers of dihydric phenols having epoxide equivalent weights of from about 170 to about 200 and from about 20 to about 80 parts by weight of a flexible epoxy resin having a maximum functionality of about 2,
(b) from about 10 to about 30 weight percent of a finely divided light metal fuel additive, said light metal fuel being selected from the group consisting of aluminum, magnesium, beryllium, magnesium alloys, aluminum alloys and mixtures thereof, and,
(c) the balance a member selected from the group consisting of hydroxylamine perchlorate $$(HClO_4 \cdot NH_2OH)$$

bishydroxylaminelithium (I) perchlorate $$(LiClO_4 \cdot 2NH_2OH)$$

tetrakishydroxylaminemagnesium (II) perchlorate $$(Mg(ClO_4)_2 \cdot 4NH_2OH)$$

and mixtures thereof,
said propellant composition having the fuel and oxidizer component concentrations predetermined within the range set forth to provide a propellant substantially stoichiometrically fuel-oxidizer balanced.

3. A solid rocket propellant composition which comprises;
about 80 parts by weight of hydroxylamine perchlorate $(HClO_4 \cdot NH_2OH)$ and about 20 parts by weight of an epoxy resin binder, said binder consisting of about 50 weight percent of an epoxy resin of diglycidyl ethers of bisphenol A having an epoxide equivalent weight of from about 170 to about 180 and about 50 weight percent of a glycerine base flexible epoxy resin.

4. A solid rocket propellant composition which comprises;
(a) about 60 parts by weight of hydroxylamine perchlorate $(HClO_4 \cdot NH_2OH)$,
(b) about 10 parts by weight of an epoxy resin of diglycidyl ethers of bisphenol A having an epoxide equivalent weight of from about 175 to about 185,
(c) about 10 parts by weight of a glycerine based flexible epoxy resin having a functionality of about 2, and,
(d) about 20 parts by weight of a particulate aluminum metal having an average particle size of about 16 microns wherein a minimum of about 95 percent of said aluminum passes through a No. 325 U.S. Standard sieve.

No references cited.

CARL D. QUARFORTH, *Primary Examiner.*

B. R. PADGETT, *Assistant Examiner.*